United States Patent [19]

Mitchell et al.

[11] Patent Number: 5,226,733
[45] Date of Patent: Jul. 13, 1993

[54] NON-LINEAR SIGNAL GAIN COMPRESSION AND SAMPLING

[75] Inventors: Michael D. Mitchell, Royal Palm Beach; David C. Smith, Jupiter, both of Fla.

[73] Assignee: United Technologies Corporation, Hartford, Conn.

[21] Appl. No.: 917,644

[22] Filed: Jul. 23, 1992

[51] Int. Cl.$^5$ .............................................. G01K 7/14
[52] U.S. Cl. ................................... 374/172; 374/178; 307/310
[58] Field of Search ............... 307/310, 353, 355, 360; 374/171, 172, 178

[56] References Cited

U.S. PATENT DOCUMENTS

| | | | |
|---|---|---|---|
| 3,152,451 | 10/1964 | Downs | 307/310 |
| 3,281,808 | 10/1966 | Church et al. | 307/310 |
| 3,524,994 | 8/1970 | Ritter | 307/310 |
| 3,722,283 | 3/1973 | Treharne | 374/172 |
| 3,812,717 | 5/1974 | Miller et al. | 374/178 |
| 4,179,691 | 12/1979 | Keller | 307/360 |
| 4,228,684 | 10/1980 | Templin | 374/178 |
| 4,443,117 | 4/1984 | Muramoto et al. | 374/171 |
| 4,847,794 | 7/1989 | Hrubes | 374/172 |
| 5,024,535 | 6/1991 | Winston, Jr. | 307/310 |

Primary Examiner—William A. Cuchlinski, Jr.
Assistant Examiner—G. Bradley Bennett
Attorney, Agent, or Firm—Robert E. Greenstien

[57] ABSTRACT

The voltage across a temperature responsive diode supplied with constant current is sensed and applied to two analog amplifiers with different gains. The output from each amplifier is applied to a sample and hold circuit. The output from each sample and hold circuit is applied to an analog to digital converter to produce two binary signals. The minimum binary value of one signal corresponds to the minimum voltage drop; the maximum to the drop at an intermediate temperature. The minimum binary value of a second signal corresponds to the drop at the intermediate temperature and the maximum binary value of this signal corresponds to the drop at a maximum temperature. Both binary signals are applied to the multiplexer which selects one signal to address a stored temperature in a look-up table. The multiplexer uses the binary signal produced with the high gain amplifier output for the address until the most significant bit in the signal switches states, when the multiplexer uses the binary signal produced from the low gain amplifier. The address is a stored temperature.

7 Claims, 2 Drawing Sheets

NON-LINEAR SIGNAL GAIN COMPRESSION AND SAMPLING

TECHNICAL FIELD

This invention relates to linearizing signals and, in particular, techniques for gain compression and sampling of non-linear signals.

BACKGROUND OF THE INVENTION

Sensors and transducers that are used to measure temperature or other radiated energy often exhibit non-linear response characteristics, leading to measurement imprecision. When the non-linearity is minor and dynamic range small, it is practical to translate—linearize—the signal through piece-wise linear approximation using look-up tables and variable gain control without producing significant errors. But, when the dynamic range is substantial, state-of-the-art signal translation methods using logarithmic amplifiers, analog gain compression and digital sampling compromise resolution and frequency response. For instance, the problem of non-linearity takes on particular importance when measuring gas turbine engine component temperatures, for instance, the temperature of rotating turbine blades, a process often using temperature responsive diodes in proximity to a rotating blade. Diodes are used because they are small, easily fitting in a small probe inserted into the engine to reach the blades. Constant current is supplied to the diode. The voltage drop across the diode is dependent on its temperature, a function of the infrared energy radiated from the blade. Blade temperature can be deduced from the voltage drop. But, a graph plotting voltage and temperature for the typical temperature responsive diode shows that the ratio of voltage change to temperature change (slope) is lower at lower temperature levels but begins to rise at an intermediate temperature, giving the curve a distinctly non-linear temperature response characteristic, in other words, temperature variable sensitivity. The practical impact is that at lower temperatures the same temperature change produces a small voltage change across the diode, a significant source of imprecision in temperature measurement over the diode's attractively wide dynamic temperature measuring range.

DISCLOSURE OF THE INVENTION

Among the objects of the present invention is providing a technique to linearize response characteristics of a measuring device, such as a temperature responsive diode without sacrificing resolution in environments with wide temperature ranges (i.e. high dynamic range).

Another object of the present invention is providing non-linear signal gain compression and sampling that can be used with a variety of "transducers" that produce output signals with non-linear response characteristics.

According to the present invention, the output signal from a transducer, such as a temperature responsive diode, is supplied simultaneously to two analog amplifiers, one having more gain than the other. The high gain amplifier produces a first analog signal and the low gain amplifier produces a second signal. The first and second signals are individually supplied to N bit analog to digital (A-D) converters. The gain of the high gain amplifier is selected to cause the A-D to produce a binary signal with a maximum binary value at a selected intermediate point between the maximum and minimum transducer output signal levels that corresponds to the point at which the transducer has greater sensitivity, i.e. where the slope begins to increase. The low gain amplifier gain is selected so its A-D produces a binary signal that has a maximum binary value corresponding to the maximum transducer output level. The low gain amplifier is provided with an offset so that the binary signal that it produces has a minimum value substantially the same (e.g. $2^N+1$) as the maximum binary value for the binary signal produced by the high gain amplifier. Both binary signals are applied to a multiplexer where the signal from the low gain amplifier is selected as the multiplexer output when the most significant bit in the first binary signal changes its binary values. The multiplexer output is applied to a look-up table, where it addresses a stored transducer, e.g. temperature.

According to an aspect of the invention, the output from the high gain and low gain amplifiers are respectively applied to individual sample and hold circuits with outputs that supply the A-D converters. The sample and hold circuits are reset at a frequency by a monostable that is driven by a clock.

According to another aspect of the invention, the multiplexer selects one of the two binary signals at a sequential rate set by the clock.

Other objects, benefits and features of the invention will be apparent to one skilled in the art from the following description.

BEST MODE FOR CARRYING OUT THE INVENTION

Figure 1:
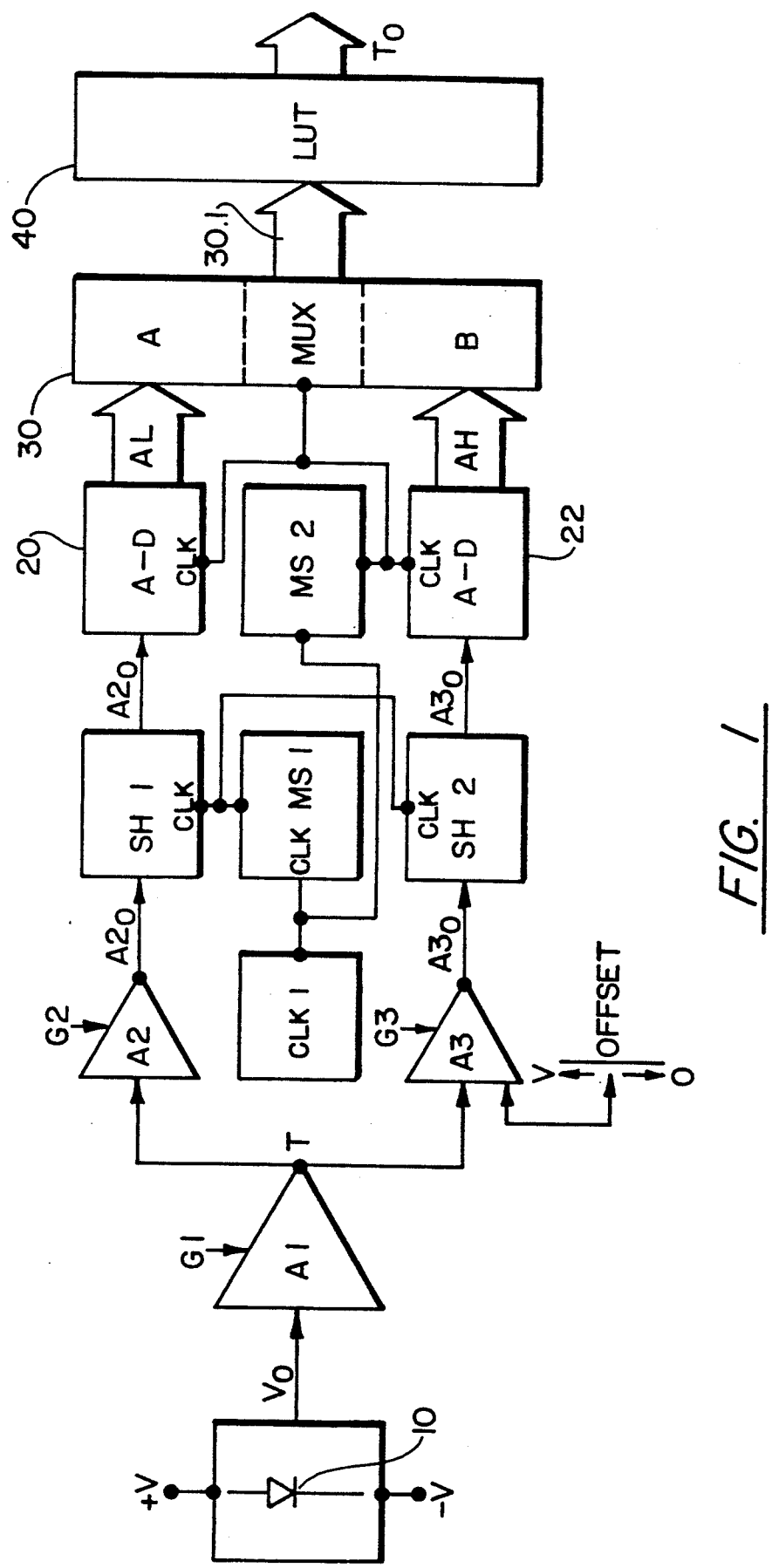
FIG. 1 is a functional block diagram of a non-linear signal gain compression and sampling system embodying the present invention.
Figure 2:
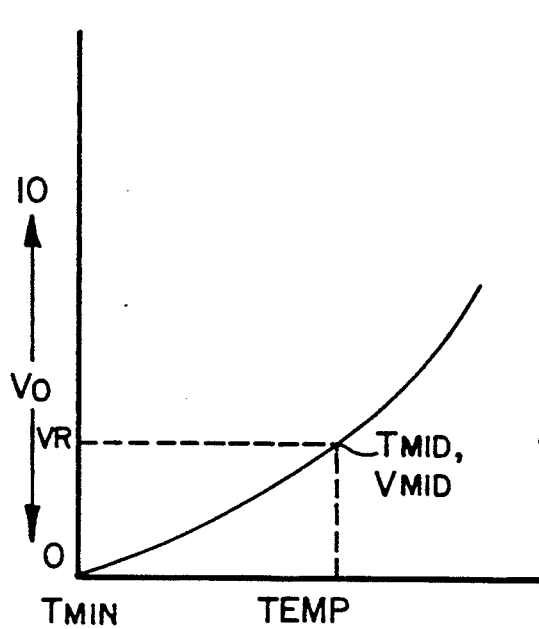
FIG. 2 is a graph showing the relationship between temperature and voltage for a temperature responsive diode shown in FIG. 1.
Figure 3:
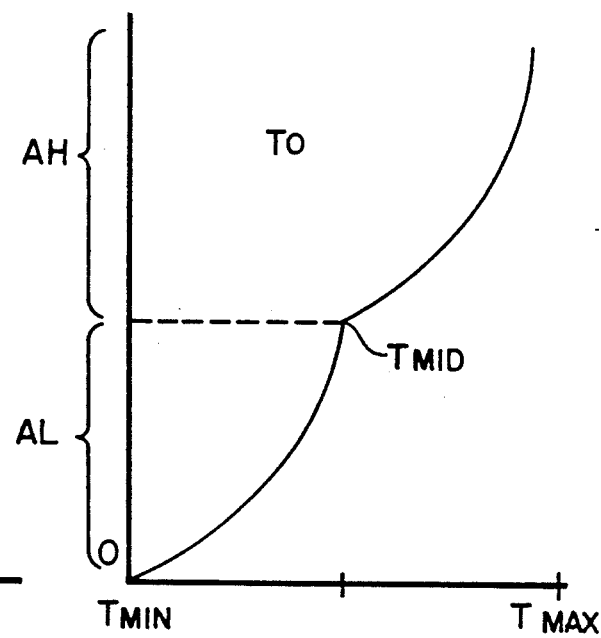
FIG. 3 is a graph showing the output from the multiplexer in FIG. 1 for different output signals from the temperature responsive diode.
Figure 4:
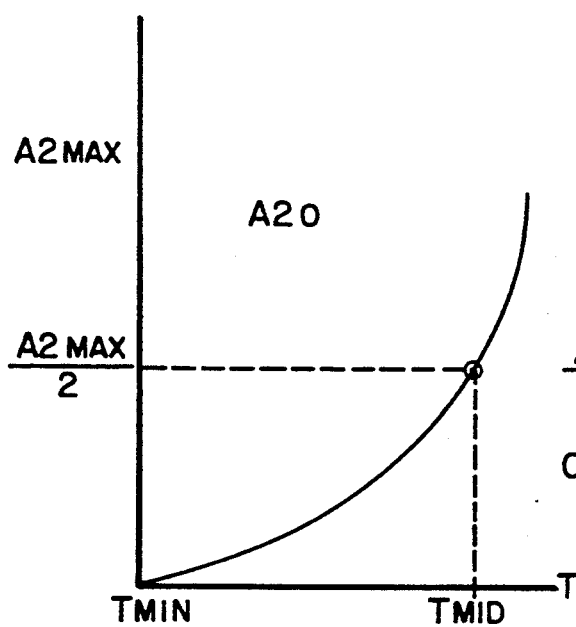
FIG. 4 is a graph showing the output from the high gain amplifier.
Figure 5:
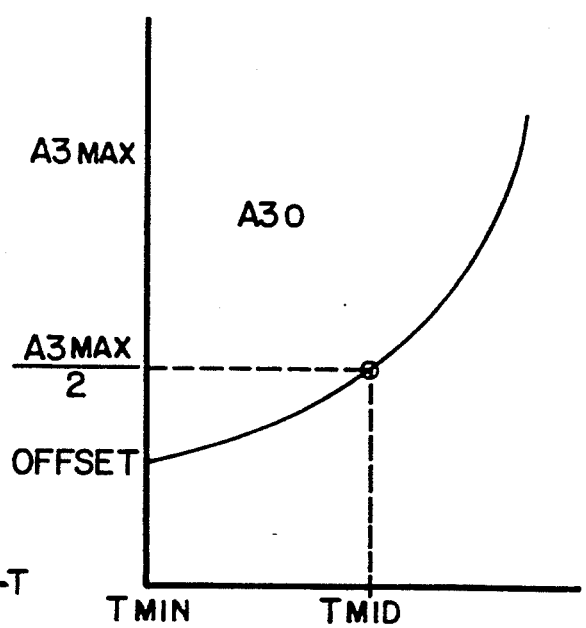
FIG. 5 is a graph showing the output from the low gain amplifier.

In FIG. 1, a transducer temperature 10 contains a responsive diode 12 which is assumed to receive constant current from a voltage supply V. The diode provides, in response to sensed temperature, an output signal VO with the general transfer characteristic of voltage and temperature shown by graph in FIG. 2. The graph demonstrates that the output characteristics between temperature and VO are not linear, leading to reduced sensitivity to temperature changes between TMIN and TMID, the region below the "knee" of the graph. The output signal VO is supplied to a first amplifier A1 with a gain set at G1. The output from amplifier A1, signal T, is provided to two amplifiers A2 and A3. Amplifier A2 has an adjustable gain of G2. Amplifier A3 also has an adjustable gain of A3. The gain of amplifier A2 is higher than the gain of amplifier G3. The output from amplifier A2, signal $A2_O$ is supplied to a sample and hold circuit SH1. The output from amplifier A3, signal $A3_O$ is supplied to a second sample and hold circuit SH2. A clock CLK1 controls the state of a monostable MS1, the output of which is supplied to the clock inputs CLK of both sample and hold circuits. When the clock CLK1 changes state, the monostable changes state, clearing the sample and hold circuits, which until that point have retained the peak value of their respective input signals $A2_O$ and $A3_O$. The output from each sample and hold circuit, signals $A2_O$ and signals $A3_O$, are individually provided to A–D converters 20, 22, which produce individual digital representations of the analog signals $A2_O$ and $A3_O$ in response to a change of state in their respective clock input lines, which takes place in response to a change in state of the output of monostable MS2, also controlled by the clock. Specifically, the first A–D converter 20 produces a signal AL, which as FIG. 2 shows represents the binary value of $A2_O$ between zero and a temperature mid-point TMID. The output from the other A–D converter 22 is the signal AH, the digital equivalent of the analog signal $A3_O$. Signal AH traces the temperature beyond TMID, as FIG. 5 shows. A multiplexer 30 receives the signals AL and AH at respective channels A and B. The multiplexer selects one of these channels A and B to produce an output signal 30.1, which is supplied as an address to a look-up table 40. The look-up table 40 uses the output to address a binary temperature value TO, which represents the measured temperature for the input signal VO supplied to amplifier A1.

The multiplexer selects between channels A and B upon a state change of a second monostable MS2. However, the criteria in determining between channel A and B in producing the multiplexer output is determined by a change in state of the most significant bit in the signal AL. For example, assuming that both A–D converters have 12 bits, each signal AH and AL is capable of resolving 4095 temperature values. Signal AL divides the temperature between TMIN and TMID into 2047 increments, starting at zero, each increment being an address in the look-up table 40 to a temperature TO. Signal AH is capable of resolving the temperature into another possible 12 bit addresses from address 2048 to 4095. On the change in state on the twelfth bit of AL (the most significant bit) the multiplexer selects channel B, and signal AH, not AL, is used as the address in the look-up table 40. This will happen only when the temperature exceeds TMIN at the next CLK pulse from clock CLK1.

By way of a specific example, assuming that VO has a possible range of zero to ten volts, signal AL would be a twelve bit word identifying a value between zero and five volts. Signal AH, on the other hand, would be a twelve bit word identifying a value between five and ten volts. Using this criteria, the gain for both amplifiers can be determined from the following equations, where $V_K$ represents the voltage VO at TMID in FIG. 2 and A2MAX produces the maximum value for signal AH and 0.5A2MAX produces the maximum value for signal AL.

$$\text{GAIN}(A2) = 0.5(A2MAX)/V_K \quad (1)$$

$$\text{GAIN}(A2) = 0.5(A2MAX)/VO - V_K \quad (2)$$

$$\text{OFFSET} = A2MAX.(0.5VO - V_K)/VO - V_K \quad (3)$$

In this example, where both A–D converters have twelve bits, address 4095 identifies VO max (ten volts). Address 2048 identifies five volts. In order to have a smooth transition when channel B is selected over channel A, which occurs between address 2047 and 2048, an offset is provided to amplifier A3. This offset is defined by the above equation (3). From this, it can be appreciated that increased resolution provided to the otherwise low resolution region between zero volts and $V_K$ volts, i.e. between TMIN and TMID, giving the temperature measurement TO more linear resolution throughout the diode's operating range.

The foregoing is a discussion and explanation of the best mode for carrying out the invention and with the benefit of it one skilled in the art may be able to make modifications and substitutions, in whole or in part, to the invention without departing from the true scope and spirit of the invention described in the claims that follow.

We claim:

1. Measurement apparatus characterized by:
   transducer means for receiving energy and for providing a first analog signal with a magnitude that varies between a minimum and maximum level as a function of the magnitude of said energy;
   first means responsive to said first analog signal for producing a first binary signal with a minimum binary value manifesting said minimum level and a maximum binary value manifesting an intermediate level between said minimum and said maximum level, and for producing a second binary signal with a maximum binary value manifesting said maximum level and a minimum binary value substantially the same as said minimum value of said first binary value;
   second means for producing an output comprising said first binary value when the level of said analog signal is between said minimum and said intermediate levels and for producing said second binary value when said analog signal is greater than said intermediate level; and
   third means for providing a stored measurement signal in response to said output, said signal manifesting said magnitude of the energy.

2. The measurement apparatus described in claim 1, further characterized in that:
   said first means comprises a first amplifier with a first gain for producing a first intermediate analog signal with a maximum level that produces said maximum binary value of said first binary signal and a second amplifier with a second gain, less than said first gain, for producing a second intermediate analog signal with a maximum level that produces said maximum binary value of said second binary signal.

3. The measurement apparatus described in claim 2, further characterized in that:
   said first means comprises sample and hold means for holding the peak value of said first and second intermediate analog signals during selected sampling intervals.

4. The measurement apparatus described in claim 3, further characterized in that:
   said second means comprises means for selecting said second binary value when the most significant bit in said first binary signal switches state.

5. The measurement apparatus described in claim 3, further characterized in that:
   said first means includes adjustable offset means for adjusting the output of said second amplifier to have a minimum output level that produces said minimum binary value of said second binary value.

6. The measurement apparatus described in claim 1, further characterized in that:

said second means comprises means for selecting said second binary value when the most significant bit in said first binary value switches state.

7. A method for linearizing a transducer output, characterized by the steps:

amplifying at a first gain a first range of signals from the transducer output and producing from said first range a first corresponding range of N binary values;

amplifying at a second gain, less than said first gain, a second range of signals from the transducer output and producing a corresponding second range of N binary values; and selecting the first or second range of binary values to address a stored value for a transducer input that produces a binary value in said first or second ranges, said first range being selected when the maximum binary value of said first range is less than the minimum binary value of said second range of binary values.

* * * * *